(12) United States Patent
Okada et al.

(10) Patent No.: US 6,459,447 B1
(45) Date of Patent: Oct. 1, 2002

(54) VIDEO SIGNAL TRANSMISSION DEVICE

(75) Inventors: Fujio Okada, Saitama-ken; Mitsuhisa Nakagawa; Keiichi Negishi, both of Kanagawa-ken, all of (JP)

(73) Assignee: Fuji Photo Optical Co., Ltd., Ohmiya (JP)

( * ) Notice: Subject to any disclaimer, the term of this patent is extended or adjusted under 35 U.S.C. 154(b) by 0 days.

(21) Appl. No.: 09/409,658

(22) Filed: Sep. 30, 1999

(30) Foreign Application Priority Data

Sep. 30, 1998  (JP) .......................................... 10-277320

(51) Int. Cl.⁷ ................................................ H04N 7/18
(52) U.S. Cl. .......................................... 348/65; 128/908
(58) Field of Search ............................... 348/65, 68–72, 348/75, 76; 600/101, 109, 132, 134; 128/908; 250/551; A62B 1/04; H04W 7/18

(56) References Cited

U.S. PATENT DOCUMENTS

| | | | | |
|---|---|---|---|---|
| 4,860,095 A | * | 8/1989 | Kimura et al. ................ | 348/65 |
| 4,931,867 A | * | 6/1990 | Kikuchi ........................ | 348/71 |
| 4,979,035 A | * | 12/1990 | Uehara et al. ................ | 348/76 |
| 5,434,615 A | * | 7/1995 | Matumoto .................... | 348/72 |
| 5,716,323 A | * | 2/1998 | Lee ............................. | 600/134 |
| 5,913,817 A | * | 6/1999 | Lee ............................. | 600/134 |
| 6,319,197 B1 | * | 11/2001 | Tsuji et al. .................. | 600/132 |

* cited by examiner

Primary Examiner—Richard Lee
(74) Attorney, Agent, or Firm—Clifford Chance Rogers & Wells LLP

(57) ABSTRACT

With an electronic endoscope, a wide band video signal is output to connected instruments without giving electric shocks to a body even when the connected instruments are not insulated. The video signal V is converted to differential signals V1, V2 by a differential amp 31 and input to buffers 42, 43 via capacitors 32, 33. The clamp signal CP generated by the clamp signal output means 44 is input to the end terminals of the switches SW1, SW2 via the photocoupler 46. The differential signals V1, V2 undergo pulse clamping in the buffers 42, 43 and the DC components are restored. The video signal restoring portion 49 restores the video signal V on the basis of the differential signals V1, V2 having undergone DC restoration and outputs the video signals to the connected instruments.

4 Claims, 2 Drawing Sheets

VIDEO SIGNAL TRANSMISSION DEVICE

BACKGROUND OF THE INVENTION

1. Field of the Invention

The present invention relates to a video signal transmission device, and more particularly to a video signal transmission device for transmitting video signals and having insulation between a primary circuit and a secondary circuit.

2. Description of the Related Art

Up to now, isolators were used in instrumentation as safety measures and countermeasures for noise interference. [The isolators] provided insulation for the direct current [component] of output signals and input signals. The former object is particularly important for protecting the subject body, as well as preventing damage to the instrument itself. In other words, the object was to separate the body from the primary circuit (ground circuit), which operates using alternating current from a power supply, and to insulate the portion inserted in the body in order to protect the body from electric shocks and prevent electrical stimulation from affecting another person. Safety standards (IEC660601-1, JIS T1001, UL2601-1, etc.) stipulate that the insertion portion of the electrocardiographs and the scope portion of the electronic endoscopes be insulated from the ground circuit, particularly for medical equipment such as electrocardiographs and electronic endoscopes.

On the other hand, it is now desirable to use CCDs [charge coupled devices] having many pixels (over 800,000 pixels, for example) in electronic endoscopes. When using such CCDs with many pixels, the limited transmission speeds result in low speed readout at a frame rate of 15 Hz (usual field readout is at 60 Hz). In order to output an image based on an image signal (video signal band of about 6 MHz) read at this low speed on a normal TV monitor, it is necessary to use a quadruple scan converter (scanning speed converter), for example, to convert the signal to a normal video signal with a field rate of 60 Hz. In the case of quadruple scan conversion (scanning speed conversion), however, the video signal band is also quadrupled, resulting in a video band of 6 MHz×4=24 MHz, for example.

In an electronic endoscope, for example, the video signal must be output through insulation in order to ensure the safety of the subject body as discussed above. If the endoscope is not insulated from externally connected instruments (hereafter referred to as connected instruments), an electrical shock can be transmitted to the body through the connected instruments even if the electronic endoscope is itself insulated from the ground circuit. In order to prevent this, the electronic endoscope must also be insulated from the connected instruments.

The use of a photocoupler and video transformer is a known metho fo transmittin vide signal throug insulatio which achieves these objects.

However, using a CCD with a large number of pixels increases the video signal band to 24 MHz, for example, as discussed above. The actual band for the video transformer and photocoupler therefore becomes less than 10 or so MHz. Sufficient transmission bandwidth cannot be ensured when these are used and the apparatus becomes difficult to use as a device for transmitting wide band video signals because of insulating the photocoupler and so forth.

SUMMARY OF THE INVENTION

The present invention was made in view of the foregoing situation. It is an object of the present invention to provide video signal transmission device for transmitting wide band video signals (for example, 20 MHz or more) across insulation between a primary circuit and a secondary circuit.

The video signal transmission device according to the present invention is a video signal transmission device having primary and secondary circuits insulated from each other and which transmits video signals between the primary and secondary circuits. This video signal transmission device comprises: differential output means, connected to either of the primary or secondary circuits, for converting a video signal t differential signals an outputtin th differential signals; two capacitors, connected between the primary and secondary circuits, for respectively transmitting the two differential signals output; clamping means for restoring the direct current component of the two differential signals output; and means for restoring the video signal, connected to the other of the primary and secondary circuits, which restores the video signal based on the two differential signals output, for which the DC components have been restored.

The video signal transmission device relating to the present invention is optimal for use as a video signal transmission device for an electronic endoscope, wherein the secondary circuit is the scope portion of an electronic endoscope with imaging means on the end thereof, and the primary circuit is the video signal input/output interface portion of the electronic endoscope.

The clamping means in the video signal transmission device relating to the present invention comprises: means for outputting clamp signals, connected to either the primary or secondary circuit, for restoring the DC component of the two differential signals output; means for transmitting clamp signals for insulating the clamp signal and transmitting the clamp signal to the other of the primary or secondary circuit; and two buffers, connected to the other of the primary or secondary circuit, to which the differential signals are input; and wherein the clamping means effects DC restoration in the buffer input portion.

The primary circuit and secondary circuit noted above must be insulated from each other, but either may be referred to as the primary circuit or secondary circuit. Usually, the primary circuit refers to the ground circuit, wherein the standard voltage of the circuit is in common with the standard voltage (a neutral point in the case of a three phase source) of the AC power source. The secondary circuit refers to that which is separated from the ground circuit.

The video signal is the signal carrying the image information and it may be an RGB signal, Y/C signal, a broadcast standard NTSC signal, or the like.

The capacitors in the video signal transmission device relating to the present invention preferably comprise a circuit substrate and a pattern formed on the circuit substrate.

In this case, it is also acceptable to form the capacitors between the patterns by forming the patterns on the same surface of the circuit substrate, or by forming patterns on both sides of the circuit substrate (on the back surface, if this is a double sided substrate, for example). Moreover, the latter is preferable in view of the strength of the insulation.

Once the video signal transmission device relating to the present invention converts a video signal to differential signals, the video signal transmission device transmits the differential signals through a capacitor junction. These capacitors can therefore be electrically insulated from each other and act as a bypass filter. This makes it possible to transmit high frequency signals for which transmission of the DC component is not possible. The influence of common mode noise is alleviated because of the conversion to differential signals. Meanwhile, because the present invention is provided with clamping means, the DC component which is removed by the capacitor junction can be restored by the clamping means. It thereby becomes possible to transmit high frequency video signals, specifically wide band video signals, through insulation. As a result, electric shocks or the like are not transmitted to the body even when the device is connected to instruments which are not insulated.

Applying the video signal transmission device, relating to the present invention, to an electronic endoscope using a CCD with many pixels ensures sufficient transmission bandwidth while making it possible to output the video signal through insulation to externally connected instruments.

Furthermore, preparing the clamp signal and outputting it via the insulation with the differential signals makes it unnecessary to prepare the clamp signal on the side receiving the differential signals. Moreover, the clamping means can be realized with a simple structure because a stabilized clamp signal can be used.

In addition, forming the capacitors with a circuit substrate and patterns formed on the circuit substrate makes it unnecessary to use discrete components. It is possible to vary pattern spacing or substrate thickness or materials, making it possible to easily allow for sufficient distance to provide insulation.

DESCRIPTION OF THE PREFERRED EMBODIMENTS

Figure 1:
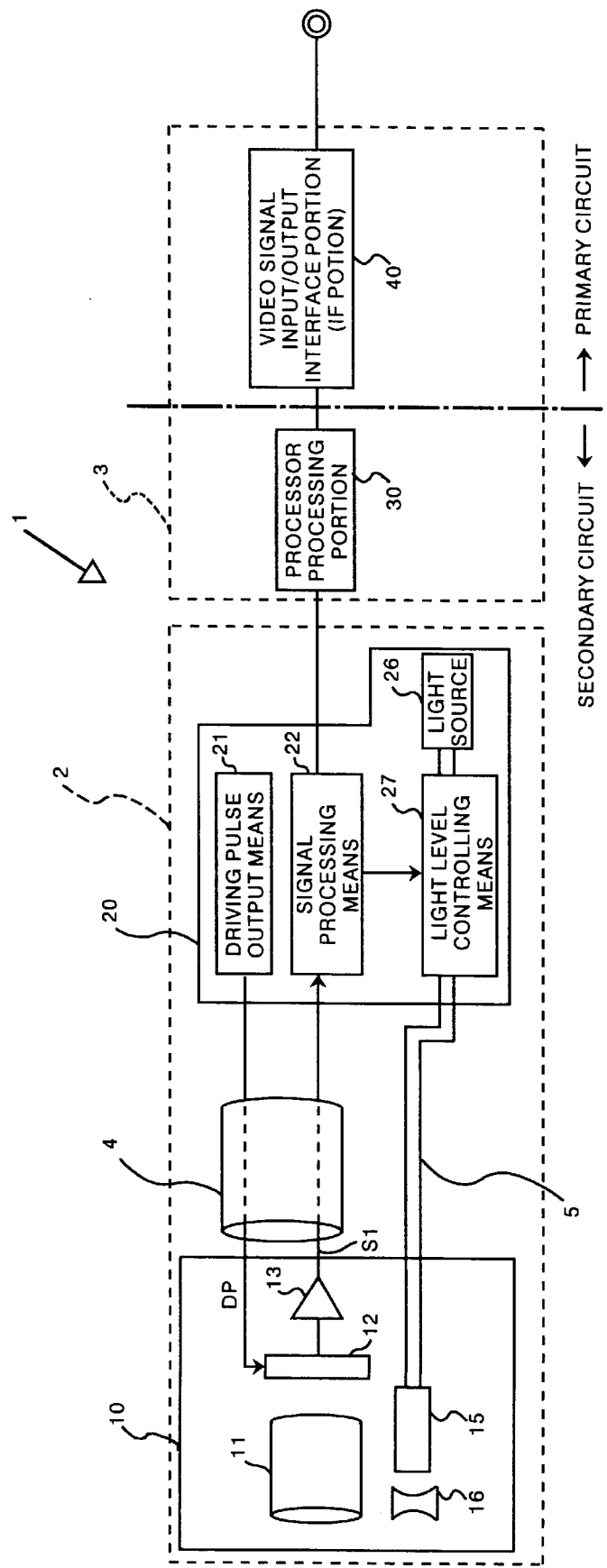
FIG. 1 is a block diagram showing the constitution of an electronic endoscope.

The embodiments of the present invention are explained in detail below with reference to the figures. This explanation concerns the application of the video signal transmission device relating to the embodiments of the present invention to an electronic endoscope. FIG. 1 is a block diagram showing the constitution of the electronic endoscope.

As shown in FIG. 1, the electronic endoscope 1 comprises a scope portion 2 and a processor portion 3. The scope portion 2 further comprises a scope end portion 10, a scope body 20, and a transmission cable 4 and light guide 5 connecting the scope end portion 10 and scope body 20.

The scope end portion 10 is provided with the following: an imaging lens 11, a CCD 12 to form an image of the subject body and attain the image signal S1, a buffer 13 to transfer the image signal S1 to the scope body 20 in the next stage, a light guide end portion 15, and an illumination lens 16.

The scope body 20 is provided with the following: driving pulse output means 21 for outputting the driving pulse DP to drive the CCD 12; signal processing means 22 for carrying out the prescribed signal processing of the input image signal S1, preparing a brightness signal Y and color-difference signal C (R-Y, B-Y), and inputting [these signals] to the following processor portion 3; a light source 26; and means for controlling light levels 27.

The processing portion 3 comprises a processor 30 and a video signal input/output interface portion (IF portion) 40. The processor 30 effects zoom processing, character data addition processing, and the like for the color-difference signal C and brightness signal Y input from the scope body 20, and then prepares an RGB signal, Y/C signal, or NTSC signal (or video signal V). The IF portion 40 outputs the video signal V from the processor 30 to the external connected instruments. In this electronic endoscope 1, insulation (isolation) is established between the processor 30 and IF portion 40. In this example, the IF portion 40 is on the primary circuit side and the processor 30 is on the secondary circuit side. Although not shown, the scope portion 2 and processor portion 3 are both constituted so as to receive power from the AC power source via the insulating transformer. The electronic endoscope 1 is itself insulated from the AC power source.

Figure 2:
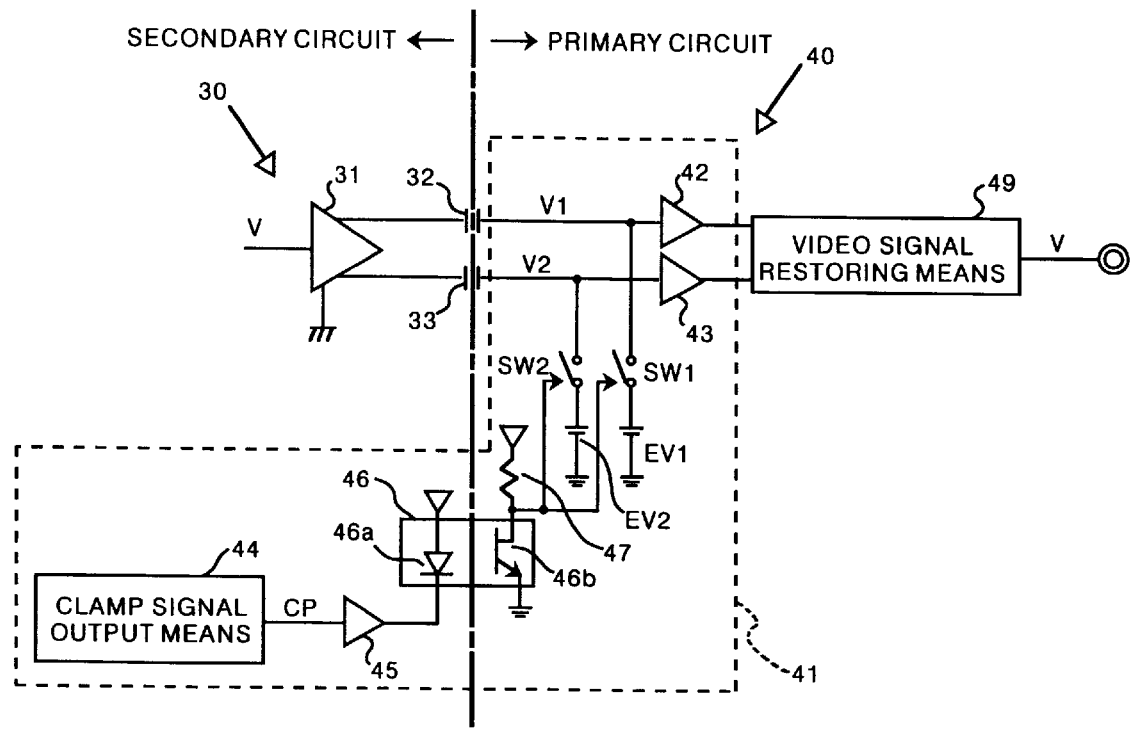
FIG. 2 is a block diagram featuring the isolation of the IF portion and processor portion in the above-mentioned electronic endoscope.

FIG. 2 is a block diagram featuring the isolation of the IF portion 40 and processor 30 in the processor portion 3.

The video signal V prepared in the processor 30 is converted to differential signals V1, V2 by the differential output means (differential amp) 31. The differential signals V1, V2 are input to the means for restoring video signals 49 by means of capacitors 32, 33 and the clamping means 41. Specifically, the differential signal V1 is input to the buffer 42 by means of the capacitor 32. Likewise the differential signal V2 is input to the buffer 43 by means of the capacitor 33. The processor 30 is provided with clamp signal output means 44 for outputting the clamp signal CP to restore the DC component of the differential signals V1, V2. By means of the buffer 45, the clamp signal CP is input to the photodiode 46a of the photocoupler 46, which is a type of clamp signal transmission means. A pull up resistor 47 is connected to the collector of the phototransistor 46b of the photocoupler 46. After passing through the photocoupler and being transmitted to the IF portion 40, the clamp signal CP is input to the control terminals of the clamp switches SW1, SW2.

One of the switches SW1, SW2 is connected to the power sources EV1, EV2, respectively, which provide the clamp voltage. The other is connected to the input portion of the buffers 42, 43 respectively.

The output portions of the buffers 42, 43 are connected to the video signal restoring means 49. As discussed below, the output signals V1, V2 of each buffer 42, 43, for which the DC components have been restored, are recombined into the video signal V and output to the external connected instruments (not shown).

The operation of the electronic endoscope with the above-mentioned constitution is explained below.

First the scope end portion 10 is inserted into a body cavity. The body cavity is illuminated with a fixed quantity of light generated by a light source 26. An image of the body cavity is created by the CCD 12 and the image signal S1 is input to the signal processing means 22 of the scope body 20 via the buffer 13 and transmission cable 4. At this time, the light controlling means 27 controls the light to an optimal level, on the basis of the brightness signal Y extracted from the image signal S1. An image signal S1 at an optimal level is thereby output from the CCD 12.

The signal processing means 22 performs the prescribed signal processing of the input image signal S1 and generates a brightness signal Y and color-difference signal C. The prescribed signal processing in this case includes Y/C separation processing to separate the image signal S1 into a brightness signal Y and color signal, y correction, contour correction, and the like.

The brightness signal Y and color-difference signal C output from the signal processing means 22 are input to the processor means 30 in the processor portion 3. The processor means 30 performs zoom processing, character data addition processing, and the like for this brightness signal Y and color-difference signal C, and then prepares a video signal V, which is an RGB signal, Y/C signal, or NTSC signal.

As shown in FIG. 2, the video signal V prepared in the processor portion 30 is converted to differential signals V1, V2 by the differential amp 31, which are then input to buffers 42, 43 by means of the capacitors 32, 33 respectively. It is thereby possible to insulate the differential signals V1, V2 (in other words, the video signal V) between the primary and secondary circuits. Because the differential signals V1, V2 are transferred via a capacitor junction, it is also possible to transmit high frequency signals. Moreover, the transmission of wide band video signals becomes possible if the video signal V is restored based on these differential signals V1, V2 as discussed below. Furthermore, the influence of common mode noise is eliminated by converting the video signal V to the differential signals V1, V2.

The clamp signal CP generated from the clamp signal output means 44 is transferred to the IF portion 40 via the buffer 45 and the photocoupler 46. The clamp signal CP transferred to the IF portion 40 is input to the control terminal of the clamp switches SW1, SW2. It is thereby possible to insulate the clamp signal CP between the primary and secondary circuits.

The clamp signal CP is input to the control terminal of the switches SW1, SW2. Pulsed clamping of differential signals V1, V2 is accomplished by turning on the switches SW1, SW2 at prescribed times. In other words, the voltage of each differential signal when the clamp signal CP is input becomes identical to the clamp voltage EV1, EV2. The DC components of the differential signals V1, V2 are thereby restored. Here, the prescribed time is preferably within the signal period (the blanking period, for example) displaying the standard voltage of the video signal V.

The video signal restoring means 49 restores the video signal V on the basis of the differential signals V1, V2 for which the DC component is restored.

With this electronic endoscope 1, wide band video signals can be transmitted through insulation. Even in the case of an electronic endoscope using a CCD with many pixels, video signals can be output to externally connected instruments through insulation. As a result, electric shocks and the like are not transmitted to the body even when the electronic endoscope 1 is connected to instruments without insulation, for example.

Because the clamp signal CP is prepared in advance and output through the insulation with the differential signals V1, V2, the clamping means can be realized with a very simple structure, as shown in FIG. 2.

Figure 3:
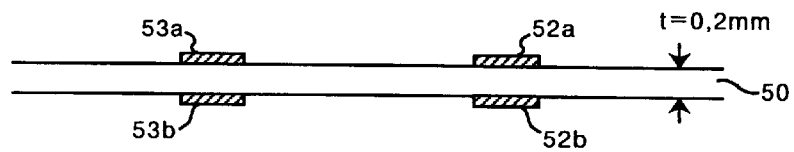
FIG. 3 is a cross sectional view of the circuit substrate when capacitors are formed on the substrate.

Moreover, the capacitors 32, 33 in the above-mentioned explanation can be constituted of a circuit substrate and patterns formed on the circuit substrate. FIG. 3 is a cross sectional view of the circuit substrate in the case of the capacitors being formed on the circuit substrate. In the example shown in FIG. 3, electrode patterns 52a, 52b for the capacitor 32 and electrode patterns 53a, 53 b for the capacitor 33 are formed on both surfaces of a circuit substrate comprising 0.2 m thick glass-epoxy material. Patterns 52a and 53a are formed opposite from patterns 52b and 53b. This structure allows for capacitors having sufficient insulation strength to meet the above-mentioned safety standards.

FIG. 3 shows the case where the capacitors are formed with the electrode patterns disposed on both sides of the circuit substrate. It is also possible, however, to form the capacitors by having the patterns disposed on the same surface. It is simpler to constitute the capacitors with the circuit substrate, because the capacitance of the capacitors can be decreased if high input impedance items, such as FET input op-amps, are used as the buffers 42, 43.

The above-mentioned explanation concerned the constitution where the clamping means 41 prepared the clamp signal CP in advance and output it through the insulation with the differential signals V1, V2. In other words, the clamp signal CP is superimposed on the video signal V (in this case it is necessarily superimposed on both the differential signals V1, V2) or either one of the differential signals V1, V2. The clamp signal CP is sampled in the primary circuit and the differential signals V1, V2 are clamped on the basis of this sampled clamp signal CP.

The above-mentioned clamping means 41 may also use a so-called pulse clamping system. However, the clamping means in the present invention is not restricted to the pulse clamping system and may also be a soft clamping system, so long as it can restore the DC components of the differential signals V1, V2.

The above-mentioned explanation concerned the application of the video signal transmission device relating to the present invention to an electronic endoscope. However, the present invention is not restricted to electronic endoscopes and may be applied to any sort of device so long as a video signal is transmitted through insulation between a primary circuit and secondary circuit. In the example discussed above, the video signal was transferred from a processor portion 30 to an IF portion 40 (specifically, from the secondary circuit to the primary circuit). However, a video signal may naturally also be transferred from the IF portion 40 to the processor portion 30 (specifically from the primary circuit to the secondary circuit).

What is claimed is:

1. A video signal transmission device, having primary and secondary circuits insulated from each other and which transmits video signals between said primary and secondary circuits, comprising:

differential output means, connected to one of said primary and secondary circuits, for converting a video signal to two differential signals and outputting the two differential signals;

two capacitors, connected between said primary and secondary circuits, for respectively transmitting said two differential signals;

clamping means for performing restoration of direct current components of said two differential signals; and means for restoring the video signal, connected to the one of said primary and secondary circuits not connected to said differential output means, which restores the video signal based on said two differential signals, for which said direct current components have been restored.

2. The video signal transmission device, according to claim 1, wherein said secondary circuit is a scope portion of an electronic endoscope having imaging means provided on an end portion thereof, and said primary circuit is a video signal input/output of said electronic endoscope.

3. The video signal transmission device, according to claim 1 or 2, wherein said clamping means comprises:

means for outputting a clamp signal, connected to one of said primary and secondary circuits, for restoring said direct current components;

means for insulating and transmitting said clamp signal to the one of said primary and secondary circuits not connected to said means for outputting a clamp signal; and two buffers, connected to the one of the primary and secondary circuits not connected to said means for outputting a clamp signal, to which said two differential signals are input;

wherein the clamping means effects said restoration of the direct current components in the input portions of said two buffers.

4. The video signal transmission device, according to claim 1 or 2, wherein said two capacitors comprise a circuit substrate and patterns formed on the circuit substrate.

* * * * *